(12) United States Patent
Adachi (10) Patent No.: US 10,448,363 B2
(45) Date of Patent: Oct. 15, 2019

(54) BASE STATION, USER TERMINAL, AND COMMUNICATION CONTROL METHOD

(71) Applicant: KYOCERA CORPORATION, Kyoto (JP)

(72) Inventor: Hiroyuki Adachi, Kawasaki (JP)

(73) Assignee: KYOCERA Corporation, Kyoto (JP)

(*) Notice: Subject to any disclaimer, the term of this patent is extended or adjusted under 35 U.S.C. 154(b) by 53 days.

(21) Appl. No.: 15/661,505

(22) Filed: Jul. 27, 2017

(65) Prior Publication Data
US 2017/0325198 A1 Nov. 9, 2017

Related U.S. Application Data

(63) Continuation of application No. PCT/JP2016/052460, filed on Jan. 28, 2016.

(30) Foreign Application Priority Data

Jan. 28, 2015 (JP) .................... 2015-013925

(51) Int. Cl.
*H04W 72/00* (2009.01)
*H04W 4/06* (2009.01)
*H04W 72/04* (2009.01)
*H04W 88/10* (2009.01)

(52) U.S. Cl.
CPC .......... *H04W 72/005* (2013.01); *H04W 4/06* (2013.01); *H04W 72/04* (2013.01); *H04W 88/10* (2013.01)

(58) Field of Classification Search
CPC ..... H04W 72/005; H04W 72/04; H04W 4/06; H04W 88/10
See application file for complete search history.

(56) References Cited

U.S. PATENT DOCUMENTS

| 8,477,644 | B2* | 7/2013 | Sugawara | H04W 72/1231 370/252 |
| 2011/0038299 | A1* | 2/2011 | Sugawara | H04L 12/189 370/312 |
| 2014/0355493 | A1* | 12/2014 | Niu | H04W 76/40 370/280 |
| 2015/0139068 | A1* | 5/2015 | Jang | H04W 52/0216 370/312 |

(Continued)

FOREIGN PATENT DOCUMENTS

| EP | 2278830 A1 | 1/2011 |
| EP | 2720504 A1 | 4/2014 |

OTHER PUBLICATIONS

An Office Action issued by the Japanese Patent Office dated Nov. 14, 2017, which corresponds to Japanese Patent Application No. 2016-572135 and is related to U.S. Appl. No. 15/661,505; with English language Concise Explanation.

(Continued)

*Primary Examiner* — Habte Mered
(74) *Attorney, Agent, or Firm* — Studebaker & Brackett PC (57) ABSTRACT

A base station includes a controller configured to perform a process of transmitting configuration information for a user terminal having a group communication function specified in 3rd Generation Partnership Project (3GPP). The configuration information includes specific subframe information indicating a specific subframe capable of constituting a physical downlink shared channel (PDSCH) for multicast.

12 Claims, 11 Drawing Sheets

(56) References Cited

U.S. PATENT DOCUMENTS

2018/0324774 A1* 11/2018 You .................. H04W 4/70

OTHER PUBLICATIONS

ZTE, "Considerations on common control messages for MTC enhancement", 3GPP TSG RAN WG1 Meeting #79, R1-144820, Nov. 17-21, 2014, San Francisco, USA.
Ericsson, "Clarification of MCCH to MCH mapping and use of empty PMCH—InfoList or MBMS—SessionInfoList", 3GPP TSG-RAN WG2 #88, R2-145048, Nov. 17-21, 2014, San Francisco, USA.
International Search Report issued in PCT/JP2016/052460; dated Mar. 29, 2016.
3rd Generation Partnership Project; Technical Specification Group Radio Access Network; Evolved Universal Terrestrial Radio Access (E-UTRA) and Evolved Universal Terrestrial Radio Access Network (E-UTRAN); 3GPP TS 36.300 V12.4.0; Dec. 2014; pp. 1-251; Stage 2, Release 12; 3GPP Organizational Partners.
3rd Generation Partnership Project; Technical Specification Group Services and System Aspects; Group Communication System Enablers for LTE (GCSE_LTE); 3GPP TS 23.468 V12.3.0; Dec. 2014; pp. 1-26; Stage 2 Release 12; 3GPP Organizational Partners.
Huawei et al.; "Group Scheduling—Alternative Solution for Group Communication"; 3GPP TSG-RAN WG2 #85; R2-140265; Feb. 10-14, 2014; pp. 1-4; Prague, Czech Republic.
Huawei et al.; "Motivation of Rel-13 New Study Item Proposal for Support of Single-Cell Point-to-Multipoint Transmission in LTE"; 3GPP RP-141920; Dec. 2, 2014; pp. 1-18.
Extended European Search Report issued by the European Patent Office dated Dec. 7, 2017, which corresponds to EP16743462.0-1870 and is related to U.S. Appl. No. 15/661,505.

* cited by examiner

*SystemInfomationBlockType13 information element*

```
-- ASN1START

SystemInformationBlockType13-r9 ::= SEQUENCE {
    mbsfn-AreaInfoList-r9           MBSFN-AreaInfoList-r9,
    notificationConfig-r9           MBMS-NotificationConfig-r9,
    lateNonCriticalExtension        OCTET STRING                    OPTIONAL,
    ...
    ...,
    [[ group-mbsfn-AreaInfoList-r13   Group-MBSFN-AreaInfoList-r13 OPTIONAL
    ]]
}

--ASN1STOP
```

*Group-MBSFN-AreaInfoList information element*

```
-- ASN1START

Group-MBSFN-AreaInfoList-r13 ::=      SEQUENCE (SIZE(1..maxGroup-MBSFN-Area)) OF
Group-MBSFN-AreaInfo-r13

Group-MBSFN-AreaInfo-r13 ::=          SEQUENCE {
    mbsfn-AreaId-r9                   INTEGER (0..255),
    g-rnti-InfoList-r13               SEQUENCE (SIZE (0..maxG-RNTI-perMBSFN)) OF
G-RNTI-info-r13 ::=
}

G-RNTI-Info-r13 ::=                       SEQUENCE {
    G-RNTI                            {Group RNTI value},
    tmgi-r9                           TMGI-r9,
    groupSubframeAllocation           BIT STRING (SIZE(40))
}

TMGI-r9 ::=                 SEQUENCE {
    plmn-Id-r9                  CHOICE {
        plmn-Index-r9               INTEGER (1..maxPLMN-r11),
        explicitValue-r9            PLMN-Identity
    },
    serviceId-r9            OCTET STRING (SIZE (3))
}

-- ASN1STOP
```

BASE STATION, USER TERMINAL, AND COMMUNICATION CONTROL METHOD

CROSS REFERENCE

This application is a continuation application of International Application No. PCT/JP2016/052460 filed Jan. 28, 2016, and claims the benefit of Japanese Patent Application No. 2015-013925 filed Jan. 28, 2015, the entire contents of which are incorporated herein by reference.

TECHNICAL FIELD

The present disclosure relates to a base station, a user terminal, and a communication control method for a multicast service.

BACKGROUND ART

In 3rd Generation Partnership Project (3GPP) which is a mobile communication system standardization project, for example, a technique in which an evolved Node B (eNB) constituting an Evolved Universal Terrestrial Radio Access Network (E-UTRAN) transmits multicast data to a user terminal (a user terminal serving as a group communication target) in an MBMS Single Frequency Network (MBSFN) subframe for a group of users having a common interest in a specific service/content is specified (Non Patent Literatures 1 and 2).

CITATION LIST

Non Patent Literature

Non Patent Literature 1: 3GPP technical specification "TS 36.300 V 12.4.0," Jan. 5, 2015
Non Patent Literature 2: 3GPP technical specification "TS 23.468 V 12.3.0," Dec. 5, 2014

SUMMARY

A base station according to a first feature includes a controller configured to perform a process of transmitting configuration information for a user terminal having a group communication function specified in 3rd Generation Partnership Project (3GPP). The configuration information includes specific subframe information indicating a specific subframe capable of constituting a physical downlink shared channel (PDSCH) for multicast.

In the first feature, the specific subframe information indicates whether each of a predetermined number of subframes is a subframe capable of constituting the PDSCH for the multicast or any other subframe, and is indicated by a bitmap format. Here, the specific subframe information includes information indicating a repetition period of information indicated by the bitmap format. Moreover, the specific subframe information includes offset information applied to information indicated by the bitmap format.

In the first feature, the configuration information includes a group-radio network temporary identifier (group-RNTI) and a temporary mobile group identity (TMGI). The group-RNTI is an RNTI used when the user terminal decodes a physical downlink control channel (PDCCH) including allocation information of the PDSCH for the multicast. The TMGI is information indicating a group to which the user terminal belongs.

In the first feature, multimedia broadcast multicast service (MBMS) transmission is suppressed in the specific subframe.

In the first feature, the controller is configured to perform a process of transmitting MBMS single frequency network (MBSFN) subframe configuration information defining a MBSFN subframe reserved for an MBSFN in downlink. The controller is configured to set a subframe other than the MBSFN subframe as the specific subframe.

In the first feature, the controller is configured to perform a process of transmitting MBMS single frequency network (MBSFN) subframe configuration information defining a MBSFN subframe reserved for an MBSFN in downlink. The controller is configured to set a subframe other than the specific subframe as the MBSFN subframe.

In the first feature, the controller is configured to issue a notification of the configuration information through a radio resource control (RRC) message. Here, the RRC message may be a system information block (SIB), specifically, a system information block (SIB) type 13.

A user terminal related to the first feature has a group communication function defined in 3rd Generation Partnership Project (3GPP). The user terminal includes a controller configured to perform a process of receiving configuration information from a base station that manages a serving cell. The configuration information includes specific subframe information indicating a specific subframe capable of constituting a physical downlink shared channel (PDSCH) for multicast data to be received by the user terminal.

A communication control method related to the first feature includes transmitting, by a base station, configuration information for a specific user terminal having a group communication function specified in 3rd Generation Partnership Project (3GPP). The configuration information includes specific subframe information indicating a specific subframe capable of constituting a physical downlink shared channel (PDSCH) for multicast.

DESCRIPTION OF EMBODIMENTS

[Overview of Embodiment]

In an MBSFN subframe, a physical multicast channel (PMCH) is used as radio resources (a physical channel) for transmitting multicast data, but in terms of the specification, in the MBSFN subframe, the use of a physical downlink shared channel (PDSCH) serving as radio resources for transmitting user data or the like in downlink is prohibited.

This means that in the MBSFN subframe, even when small-sized data is transmitted through the PMCH, many radio resources other than the PMCH in the MBSFN subframe are not used. The problem in that the radio resources are wasted is also pointed out in a standardization process in 3GPP (for example, see 3GPP contribution RP-141920 {Dec. 2, 2014}).

Due to this problem, in 3GPP, standardization of a technique in which an eNB is assumed to transmit multicast data to a user terminal serving as a group communication target through the PDSCH is under review. This technique is referred to as single-cell point to multipoint (PTM) transmission (SC-PTM transmission) (for example, see 3GPP contribution RP-142205 {Dec. 9, 2014}). A process suitable for efficiently using the PDSCH is desired for the SC-PTM transmission technique.

In this regard, an embodiment provides a technique that enables the user terminal serving as the group communication target to efficiently receive the multicast data through the PDSCH.

A communication control method according to first and second embodiments is a method for enabling a user terminal having a group communication function specified in 3rd Generation Partnership Project (3GPP) to efficiently receive the multicast data through the PDSCH. The communication control method includes transmitting, by a base station, configuration information for a specific user terminal having a group communication function specified in 3rd Generation Partnership Project (3GPP). The configuration information includes specific subframe information indicating a specific subframe capable of constituting a physical downlink shared channel (PDSCH) for multicast.

A base station according to first and second embodiments includes a controller configured to perform a process of transmitting configuration information for a user terminal having a group communication function specified in 3rd Generation Partnership Project (3GPP). The configuration information includes specific subframe information indicating a specific subframe capable of constituting a physical downlink shared channel (PDSCH) for multicast.

Here, the specific subframe information indicates whether each of a predetermined number of subframes is a subframe capable of constituting the PDSCH for the multicast or any other subframe, and is indicated by a bitmap format. Moreover, the specific subframe information includes information indicating a repetition period of information indicated by the bitmap format. Furthermore, the specific subframe information includes offset information applied to information indicated by the bitmap format.

The configuration information includes a group-radio network temporary identifier (group-RNTI) and a temporary mobile group identity (TMGI). The group-RNTI is an RNTI used when the user terminal decodes a physical downlink control channel (PDCCH) including allocation information of the PDSCH for the multicast. The TMGI is information indicating a group to which the user terminal belongs.

Multimedia broadcast multicast service (MBMS) transmission is suppressed in the specific subframe.

The controller of the base station is configured to perform a process of transmitting MBMS single frequency network (MBSFN) subframe configuration information defining a MBSFN subframe reserved for an MBSFN in downlink. The controller is configured to set a subframe other than the MBSFN subframe as the specific subframe.

The controller of the base station is configured to perform a process of transmitting MBMS single frequency network (MBSFN) subframe configuration information defining a MBSFN subframe reserved for an MBSFN in downlink. The controller is configured to set a subframe other than the specific subframe as the MBSFN subframe.

The base station is configured to issue a notification of the configuration information through a radio resource control (RRC) message. Here, the RRC message may be a system information block (SIB), specifically, a system information block (SIB) type 13.

In the first and second embodiments, a user terminal related to the first feature has a group communication function defined in 3rd Generation Partnership Project (3GPP). The user terminal includes a controller configured to perform a process of receiving configuration information from a base station that manages a serving cell. The configuration information includes specific subframe information indicating a specific subframe capable of constituting a physical downlink shared channel (PDSCH) for multicast data to be received by the user terminal.

[First Embodiment]

An embodiment in the LTE system will be described below.

(1) System Configuration

Figure 1:
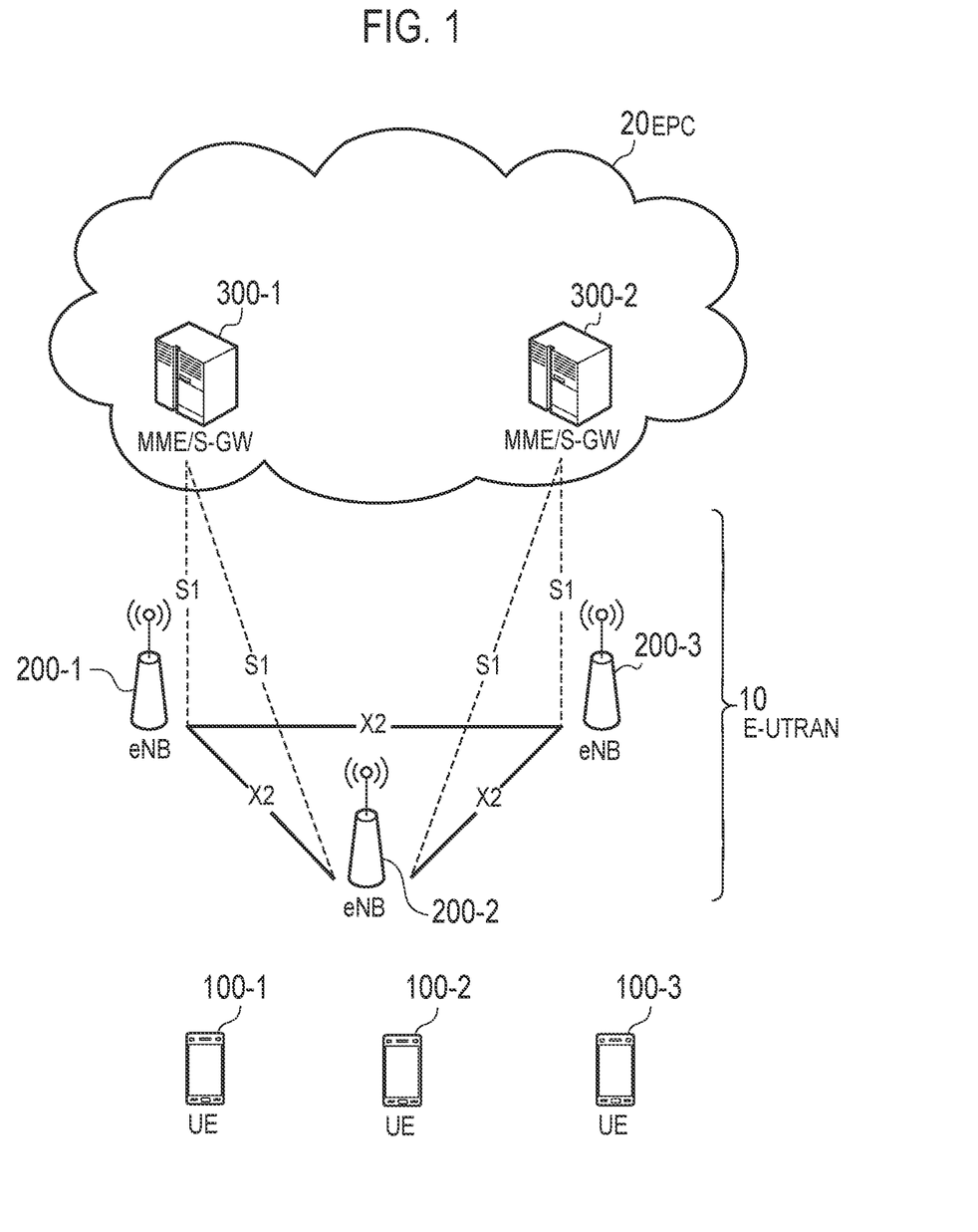
FIG. 1 is a configuration diagram of an LTE system according to first and second embodiments.

FIG. 1 is a block diagram of an LTE system according to a first embodiment. The LTE system according to the first embodiment includes user equipment (UE) 100, an evolved-UMTS terrestrial radio access network (E-UTRAN) 10, and an evolved packet core (EPC) 20 as illustrated in FIG. 1.

The UE 100 corresponds to user terminal. The UE 100 is a mobile communication apparatus and performs radio communication with a cell (a serving cell). A configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. A configuration of the eNB 200 will be described later.

The eNB 200 manages one or more cells and performs radio communication with the UE 100 that has established a connection with a cell thereof. The eNB 200 has a radio resource management (RRM) function, a user data routing function, a measurement control function for mobility control/scheduling, and the like. In addition to a term indicating a minimum unit of a radio communication area, "cell" is also used as a term indicating a function performing radio communication with the UE 100.

The EPC 20 corresponds to a core network. The EPC 20 includes a mobility management entity (MME)/serving-gateway (S-GW) 300. The MME performs various kinds of mobility control or the like on the UE 100. The S-GW performs user data transfer control. The MME/S-GW 300 is connected to the eNB 200 via an S1 interface. The E-UTRAN 10 and the EPC 20 constitute a network of the LTE system.

Figure 2:
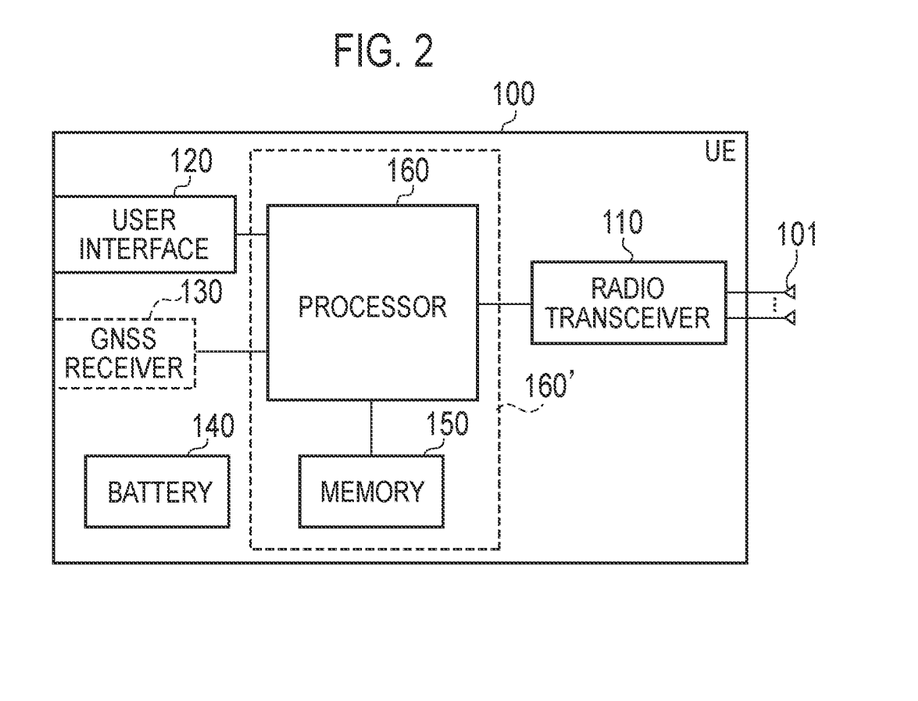
FIG. 2 is a block diagram of a UE according to the first and second embodiments.

FIG. 2 is a block diagram of the UE 100. The UE 100 includes a plurality of antennas 101, a radio transceiver 110, a user interface 120, a global navigation satellite system (GNSS) receiver 130, a battery 140, a memory 150, and a processor 160 as illustrated in FIG. 2. The memory 150 and the processor 160 constitute a controller.

The UE 100 may not include the GNSS receiver 130. Further, the memory 150 may be integrated with the processor 160, and this set (that is, a chipset) may be used as a processor 160' (controller). Alternatively, the processor 160 may be used as a controller.

The antenna 101 and the radio transceiver 110 are used for transmission and reception of radio signals. The radio transceiver 110 converts a baseband signal (a transmission signal) output from the processor 160 into a radio signal and transmits the radio signal from the antenna 101. In addition, the radio transceiver 110 converts a radio signal received by the antenna 101 into a baseband signal (a reception signal) and outputs the baseband signal to the processor 160.

The user interface 120 is an interface with a user who owns the UE 100, and includes, for example, a display, a microphone, a speaker, various buttons, or the like. The user interface 120 receives an operation from the user and outputs a signal indicating content of the operation to the processor 160. The GNSS receiver 130 receives a GNSS signal and outputs the received signal to the processor 160 in order to obtain position information indicating a geographical position of the UE 100. The battery 140 stores electric power to be supplied to the blocks of the UE 100.

The memory 150 stores a program executed by the processor 160 and information used for a process performed by the processor 160.

The processor 160 includes a baseband processor that performs modulation/demodulation, encoding/decoding, and the like of the baseband signal and a central processing unit (CPU) that performs various kinds of processes by executing the program stored in the memory 150. The processor 160 may further include a codec that encodes and decodes audio and video signals. The processor 160 executes various kinds of processes to be described later and various kinds of communication protocols.

Figure 3:
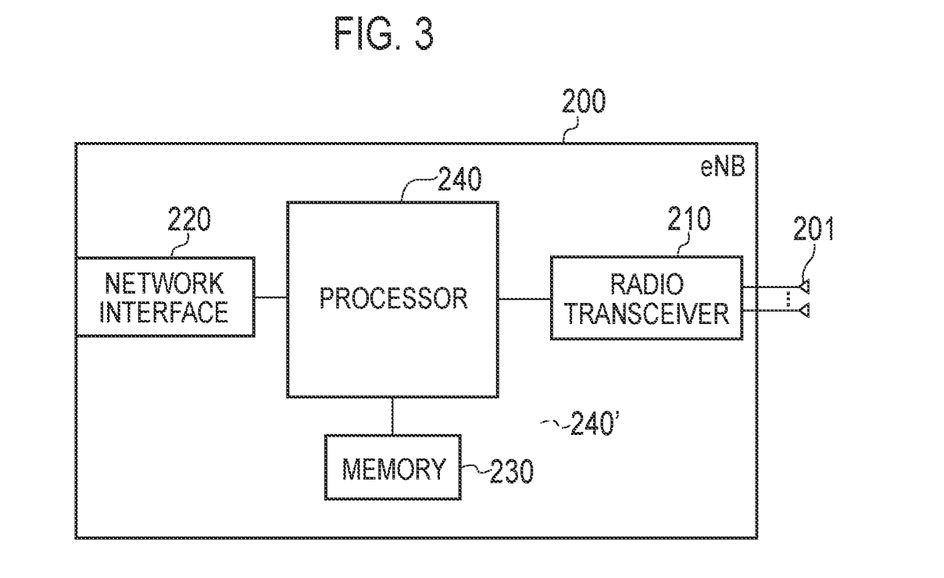
FIG. 3 is a block diagram of an eNB according to the first and second embodiments.

FIG. 3 is a block diagram of the eNB 200. The eNB 200 includes a plurality of antennas 201, a radio transceiver 210, a network interface 220, a memory 230, and a processor 240 as illustrated in FIG. 3. The memory 230 and the processor 240 constitute a controller. Further, the memory 230 may be integrated with the processor 240, and this set (that is, a chipset) may be used as a processor (controller). Alternatively, the processor 240 may be used as a controller.

The antenna 201 and the radio transceiver 210 are used for transmission and reception of radio signals. The radio transceiver 210 converts a baseband signal (a transmission signal) output from the processor 240 into a radio signal and transmits the radio signal from the antenna 201. Further, the radio transceiver 210 converts a radio signal received by the antenna 201 into a baseband signal (a reception signal) and outputs the baseband signal to the processor 240.

The network interface 220 is connected to a neighbor eNB 200 via an X2 interface and connected to the MME/S-GW 300 via an S1 interface. The network interface 220 is used for communication performed on the X2 interface and communication performed on the S1 interface.

The memory 230 stores a program executed by the processor 240 and information used for a process performed by the processor 240.

The processor 240 includes a baseband processor that performs modulation/demodulation, encoding/decoding, and the like of the baseband signal and a CPU that performs various kinds of processes by executing the program stored in the memory 230. The processor 240 executes various kinds of processes to be described later and various kinds of communication protocols.

Figure 4:
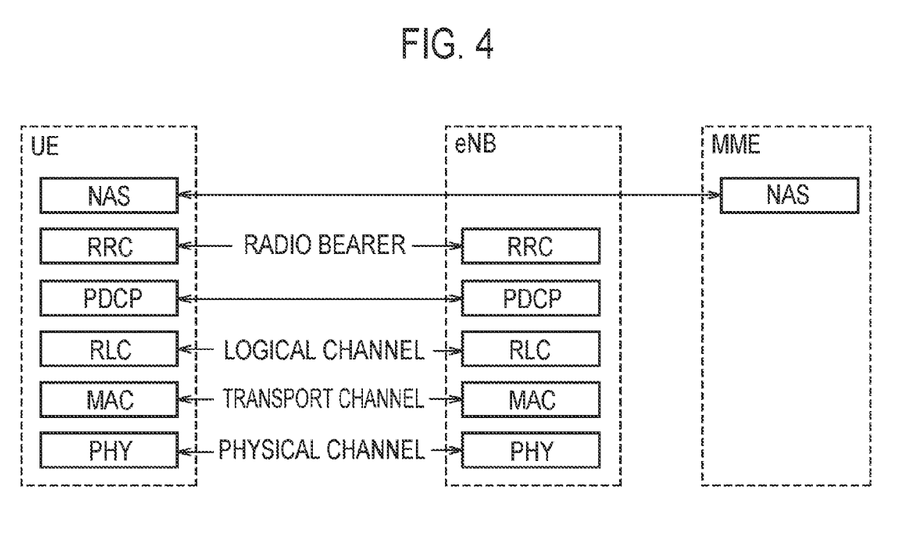
FIG. 4 is a protocol stack diagram of a radio interface according to the first and second embodiments.

FIG. 4 is a protocol stack diagram of a radio interface in the LTE system. As illustrated in FIG. 4, the radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs encoding/decoding, modulation/demodulation, antenna mapping/demapping, and resource mapping/demapping. User data and a control signal are transmitted between the physical layer of the UE 100 and the physical layer of the eNB 200 via the physical channel.

The MAC layer performs priority control of data, a retransmission process by hybrid ARQ (HARQ), a random access procedure, and the like. User data and a control signal are transmitted between the MAC layer of the UE 100 and the MAC layer of the eNB 200 via the transport channel. The MAC layer of the eNB 200 includes a scheduler that decides uplink and downlink transport formats (a transport block size and a modulation and coding scheme) and an allocated resource block for the UE 100.

The RLC layer transmits data to the RLC layer on a reception side using the functions of the MAC layer and the physical layer. User data and a control signal are transmitted between the RLC layer of the UE 100 and the RLC layer of the eNB 200 via a logical channel.

The PDCP layer performs header compression/decompression and encryption/decryption.

The RRC layer is defined only on a control plane for dealing with a control signal.

A control signal (an RRC message) for various kinds of configurations is transmitted between the RRC layer of the UE 100 and the RRC layer of the eNB 200. The RRC layer controls logical channels, transport channels, and physical channels in accordance with establishment, re-establishment, and release of a radio bearer. When there is a connection (RRC connection) between the RRC of the UE 100 and the RRC of the eNB 200, the UE 100 is in an RRC connected state, and otherwise, the UE 100 is in an RRC idle state.

A non-access stratum (NAS) layer located above the RRC layer performs session management, mobility management, and the like.

Figure 5:
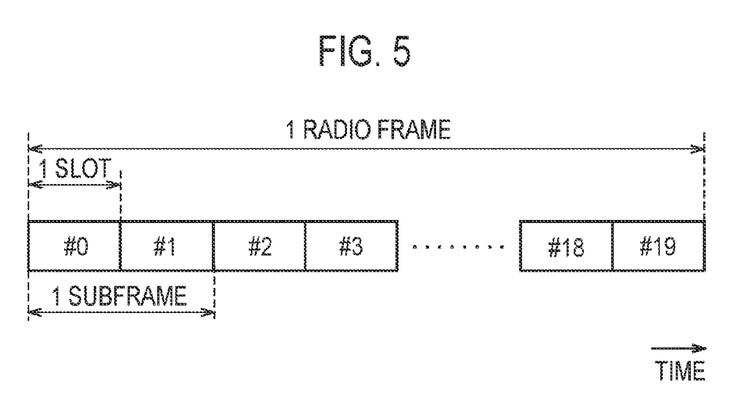
FIG. 5 is a configuration diagram of a radio frame according to the first and second embodiments.

FIG. 5 is a configuration diagram of a radio frame used in the LTE system. In the LTE system, orthogonal frequency division multiple access (OFDMA) is applied to downlink, and Single Carrier Frequency Division Multiple Access (SC-FDMA) is applied to uplink.

As illustrated in FIG. 5, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in a time direction. Each resource block includes a plurality of subcarriers in the frequency direction. Among the radio resources (time/frequency resources) allocated to the UE 100, frequency resources is able to be specified by resource blocks, and time resources is able to be specified by subframes (or slots).

In the downlink, an interval of first few symbols of each subframe is an area used mainly as a physical downlink control channel (PDCCH) for transmitting a control signal. The remaining intervals of each subframe are areas that are able to be mainly used as a physical downlink shared channel (PDSCH) for transmitting downlink data.

In the uplink, both end portions of each subframe in the frequency direction are areas used mainly as a physical uplink control channel (PUCCH) for transmitting a control signal. The other part in each subframe is an area that is able to be used mainly as a physical uplink shared channel (PUSCH) for transmitting user data.

(2) Multimedia Broadcast Multicast Service (MBMS)

The LTE system according to the first embodiment supports an MBMS. In the MBMS, the UE 100 receives multimedia data (MBMS data) delivered from a network in a multicast or broadcast manner. The UE 100 is able to receive the MBMS data not only in the RRC connected state but also in the RRC idle state.

Figure 6:
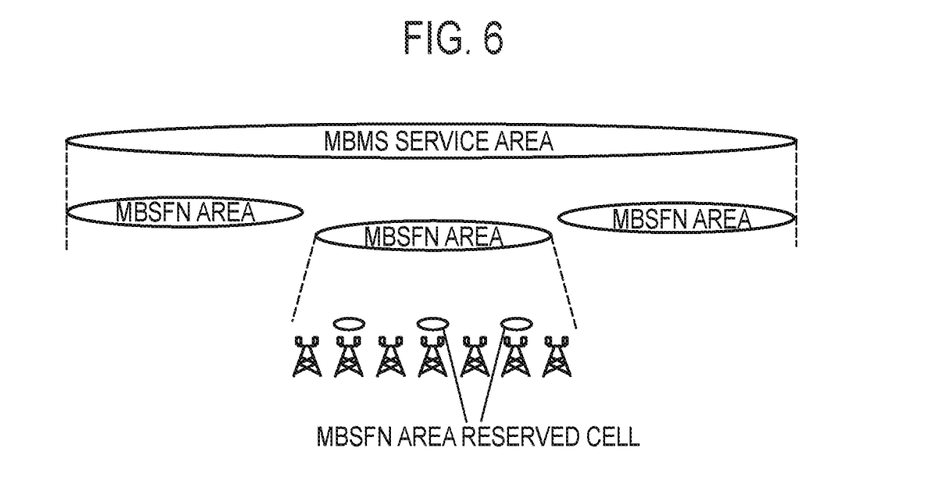
FIG. 6 is a diagram illustrating an area in which an MBMS according to the first and second embodiments is provided.

FIG. 6 is a diagram illustrating an area in which the MBMS is provided. As illustrated in FIG. 6, one multicast-broadcast single-frequency network (MBSFN) area is configured with a plurality of cells, and an MBMS service area is configured with a plurality of MBSFN areas. One cell is able to be associated with a plurality of MBSFN areas.

Figure 7:
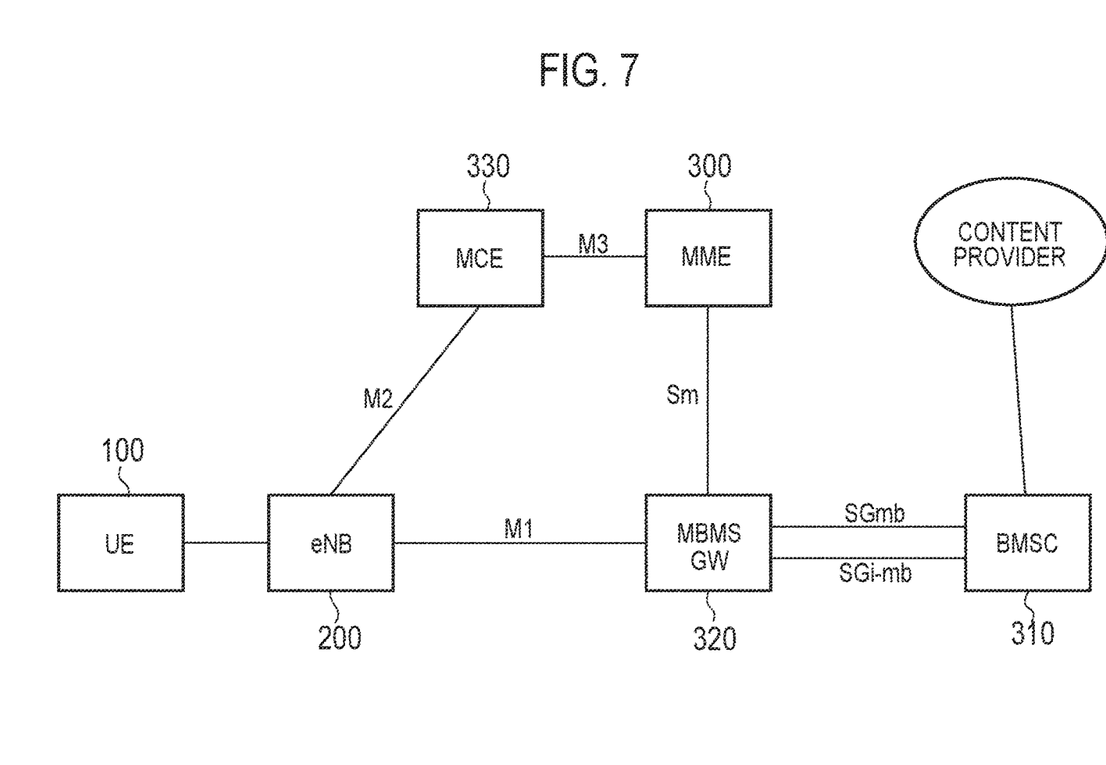
FIG. 7 is a diagram illustrating a network configuration related to the MBMS according to the first and second embodiments.

FIG. 7 is a diagram illustrating a network configuration related to the MBMS. A broadcast multicast service center (BMSC) 310 provides a function of delivering the MBMS data as illustrated in FIG. 7. An MBMS gateway (MBMS-GW) 320 broadcasts the MBMS data to each eNB 200. A multi-cell coordination entity (MCE) 330 controls radio resources to be used by each of the eNBs 200 in the same MBSFN area and sets an MBSFN subframe.

(3) SC-PTM Transmission

The LTE system according to the first embodiment also supports a group communication function specified in 3rd generation partnership project (3GPP) (for example, see 3GPP technical specification TS 23.468). The LTE system according to the first embodiment supports an SC-PTM transmission technique for the group communication function.

In the SC-PTM transmission technique, the eNB 200 transmits (delivers) group multicast data for a group configured with a plurality of UEs 100 (the UE 100-1, the UE 100-2, and the UE 100-3) (for example, content information, traffic information, or the like for a specific user) to the UEs 100 constituting the group through the PDSCH. The UE 100 is able to receive the group multicast data not only in the RRC connected state but also in the RRC idle state.

For a network configuration for supporting the SC-PTM transmission technique, a network configuration related to the MBMS illustrated in FIG. 7 is diverted. The network configuration for supporting the SC-PTM transmission technique may be configured to include a node not illustrated in the network configuration related to MBMS illustrated in FIG. 7 (for example, a GCS application server (GCS AS)). For example, content of the GCS application server is based on the 3GPP technical specification TS 23.468. Hereafter, a "node" may be understood to be replaced with an "entity."

Figure 8:
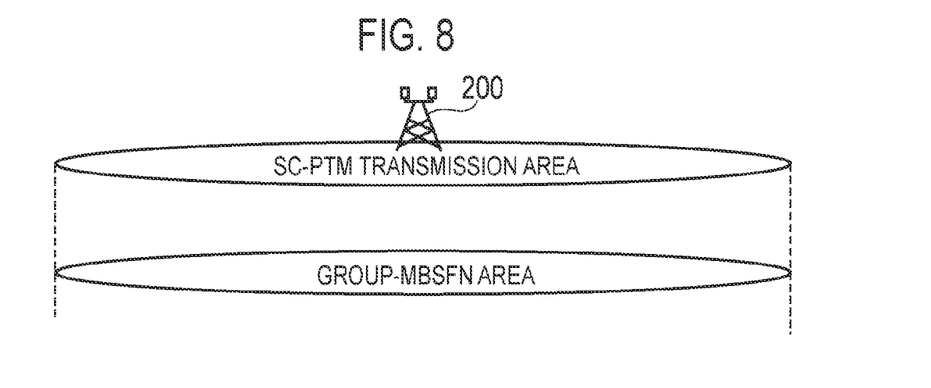
FIG. 8 is a diagram illustrating an area in which SC-PTM transmission according to the first and second embodiments is executable.

FIG. 8 is a diagram illustrating an area in which SC-PTM transmission is executable. As illustrated in FIG. 8, an area (an SC-PTM transmission area) in which the SC-PTM transmission is executable is targeted to one cell (single cell) managed by the eNB 200 and is configured with at least one or more group-MBSFN areas. FIG. 8 illustrates an example of one group-MBSFN area.

(4) Communication Control Method According to First Embodiment

Figure 9:
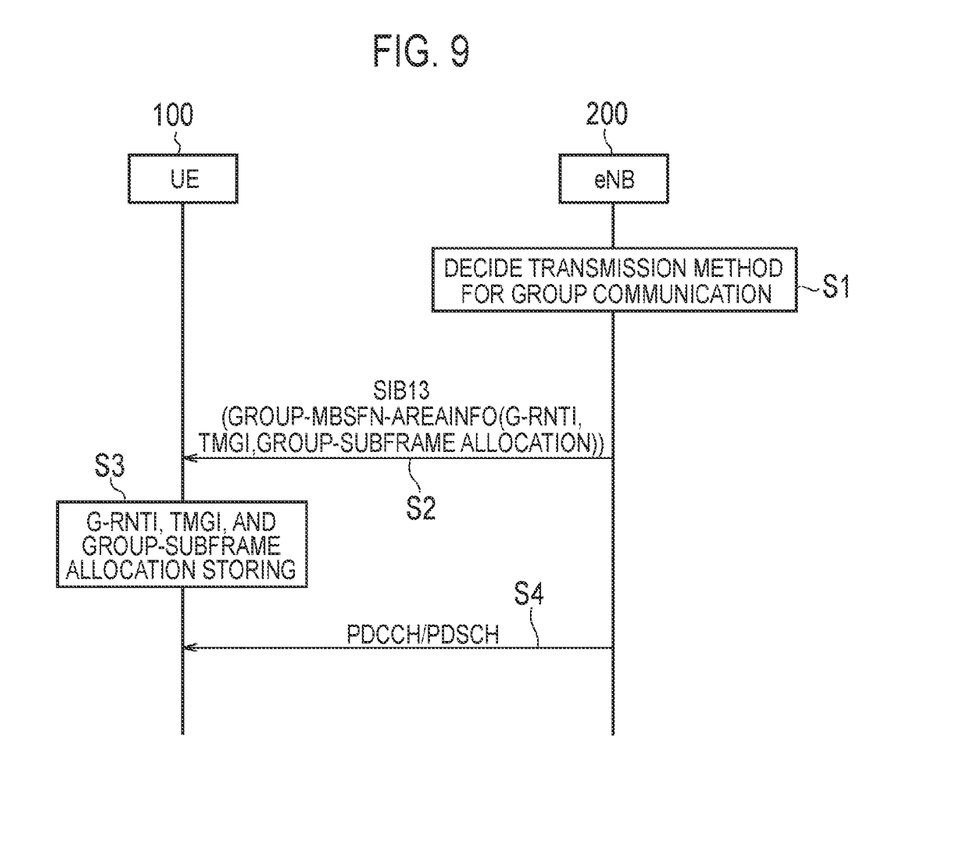
FIG. 9 is a sequence diagram illustrating a communication control method according to the first embodiment.

FIG. 9 is a sequence diagram illustrating a communication control method according to the first embodiment. In FIG. 9, the UE 100 (the user terminal) acquires a temporary mobile group identity (TMGI) which is identification information indicating a group to which its own UE belongs from the eNB 200 in advance through the RRC message and stores the TMGI. The eNB 200 is assumed to store the TMGI for the UE 100 in addition to the process of transmitting the TMGI to the UE 100.

The UE 100 may update the stored TMGI for the own UE in a predetermined procedure (for example, an RRC connection reconfiguration). The eNB 200 may update the stored TMGI each time the TMGI of the UE 100 is updated.

The eNB 200 decides a transmission scheme for transmitting the multicast data for group communication transmitted from a network side node (for example, an MME) to a plurality of UEs 100 belonging to the same group (step S1). Specifically, in step S1, the eNB 200 decides whether the transmission scheme is an MBMS scheme or an SC-PTM transmission scheme on the basis of, for example, at least one of the following policies (step S1).

(Policy 1) Decision Based on Traffic State in Cell

The eNB 200 decide to apply the SC-PTM transmission scheme in order to efficiently use the radio resources when a value indicating traffic in the cell is a predetermined threshold value (TH1) or more (when the traffic in the cell is crowded). The eNB 200 decides to apply the MBMS scheme when the value indicating the traffic in the cell is less than the predetermined threshold value (TH1) (when the traffic in the cell is not crowded). Although the value indicating the traffic in the cell is less than the predetermined threshold value (TH1), when the multicast data to be transmitted to the UE 100 is data having a high urgency or having a high priority, the eNB 200 may decide to apply the SC-PTM transmission scheme exceptionally.

(Policy 2) Decision Based on Traffic Volume for Group Communication

The eNB 200 decides to apply the SC-PTM transmission scheme in order to efficiently use the radio resources when a traffic volume of the multicast data for the group communication transmitted from the network side node is a predetermined threshold value (TH2) or more. The eNB 200 decides to apply the MBMS scheme when the traffic volume of the multicast data for the group communication is less than the predetermined threshold value (TH2).

(Policy 3) Decision Based on Number of TMGIs (Number of Destinations) for Group Communication The eNB 200 stores the TMGI for the UE 100 as described above. The eNB 200 is able to store a plurality of TMGIs for a plurality of groups. Therefore, the eNB 200 is able to decide the transmission scheme on the basis of the number of stored TMGIs. Specifically, the eNB 200 decides to apply the MBMS scheme when the number of stored TMGIs is a predetermined number (TH3) or more. This is because the use efficiency of radio resources does not degrade even though the MBMS scheme is applied. When the number of TMGIs is less than the predetermined number (TH3), the eNB 200 decides to employ the SC-PTM transmission scheme in order to efficiently use the radio resources.

(Policy 4) Decision Based on Use Status of MBMS

The eNB 200 decides to apply the SC-PTM transmission scheme in order to efficiently use the radio resources when an amount of radio resources allocated for the MBMS in a predetermined period is a predetermined amount (TH4) or more (when the MBMS is used by many UEs). The eNB 200 decides to apply the MBMS scheme when the amount of radio resources allocated for the MBMS in the predetermined period is less than the predetermined amount (TH4).

In step S1, the eNB 200 decides whether the transmission scheme is the MBMS scheme or the SC-PTM transmission scheme on the basis of the policies described above, but other processes may be applied. Other processes include first to third process.

The first process is a process in which a network side node (not illustrated) (for example, an MME) (hereinafter referred to simply as a "network node") decides whether the transmission scheme is the transmission scheme according to the MBMS scheme or the transmission scheme according to the SC-PTM transmission scheme in accordance with a predetermined policy. The second process is a process in which the network node transmits the transmission scheme decided in the first process to the eNB 200. The third process is a process in which the eNB 200 detects and employs the transmission scheme transmitted from the network node in the second process.

In the first process, the predetermined policy in which the network node decides the transmission scheme is, for example, a policy in which the network node decides the transmission scheme on the basis of the traffic volume of the multicast data for the group communication.

Specifically, the network node detects the traffic volume of the multicast data for the group communication. Then, the network node decides to apply the SC-PTM transmission scheme when the detected traffic volume is a predetermined threshold value (TH5) or more. The network node decides to apply the SC-PTM transmission scheme when the detected traffic volume is less than the predetermined threshold value (TH5). Further, the network node is not limited to the above policies, and for example, the transmission scheme may be decided by a policy similar to the above-described policy (policy 3).

In FIG. 9, the eNB 200 transmits the configuration information (configuration) for the UE 100 on the basis of the transmission scheme decided in step S1. The configuration information will be described later. In FIG. 9, the description is continued under the assumption that the eNB 200 employs the SC-PTM transmission scheme as the transmission scheme to the UE 100 in step S1.

After transmitting a system information block type 1 (SIB 1) which is an RRC message, the eNB 200 transmits a system information block type 13 (SIB 13) which is an RRC message on the basis of the timing information indicated by the SIB 1 (step S2).

Figure 10:
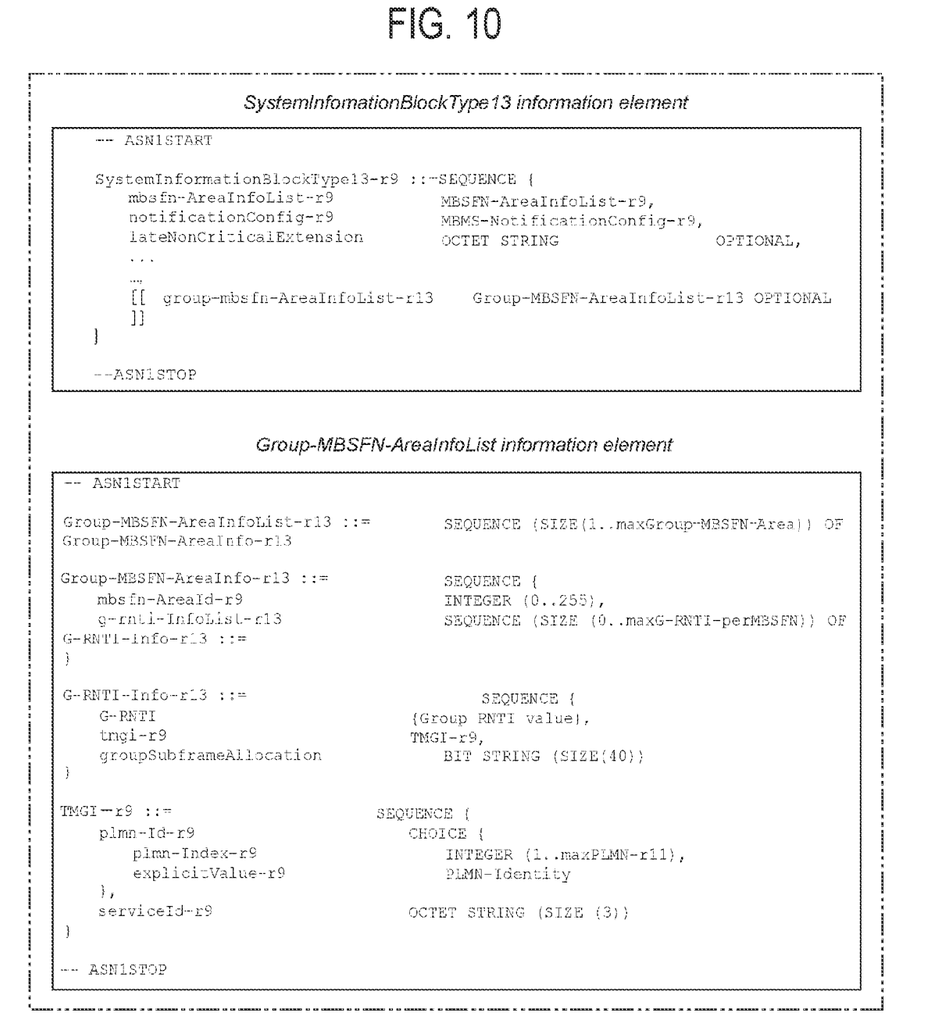
FIG. 10 is a diagram illustrating a format of an RRC message according to the first embodiment.

As illustrated in FIG. 10, the SIB 13 includes "group-mbsfn-AreaInfoList," and "group-mbsfn-AreaInfoList" includes "group-mbsfn-AreaInfo." "group-mbsfn-AreaInfo" includes "G-RNTI-Info." "G-RNTI-Info" includes "G-RNTI," "tmgi (TMGI)" and "group SUBFRAME allocation." "G-RNTI," "tmgi (TMGI)," and "group Subframe Allocation" will be described later in detail. Further, "group-mbsfn-AreaInfoList" corresponds to the configuration information described above.

Upon receiving the SIB 13 transmitted from the eNB 200, the UE 100 stores "G-RNTI" and "group Subframe Allocation" included in the SIB 13 when "tmgi (TMGI)" included in the SIB 13 is similar to the TMGI for its own UE which is stored in its own UE in advance (step S3).

Here, "G-RNTI," "tmgi (TMGI)," and "group Subframe Allocation" will be described.

"G-RNTI" is a radio network temporary identifier (RNTI) for the group communication. "G-RNTI" is used when the UE 100 decodes the PDCCH for the group communication. In this case, the PDCCH includes allocation information of radio resources for the PDSCH which is transmitted for the group communication in the multicast manner. The PDCCH is scrambled by "G-RNTI" in advance.

"tmgi (TMGI)" is identification information indicating a group to which the UE having the group communication function belongs.

"group Subframe Allocation" indicates a subframe (a specific subframe) that is able to constitute the PDSCH transmitted for the group communication in the multicast manner and the PDCCH including the allocation information of the radio resources for the PDSCH. "group Subframe Allocation" is a specific example of specific subframe information indicating a specific subframe that is able to constitute the PDSCH for the multicast. Content indicating the "group Subframe Allocation" will be separately described in detail with reference to FIG. 11.

Subsequently, the description based on FIG. 9 is continued. After transmitting the SIB 13 in step 1, the eNB 200, the eNB 200 transmits the PDSCH including the multicast data for the group communication and the PDCCH including the allocation information of the radio resources for this PDSCH for the group to which the UE 100 belongs in the specific subframe indicated in "group Subframe Allocation" on the basis of "group Subframe Allocation" included in the SIB 13 previously transmitted to the UE 100 (step S4).

Upon receiving the PDCCH transmitted from the eNB 200 in the specific subframe in step S4, the UE 100 decodes the PDCCH using "G-RNTI" stored in step S3, detects an allocation state of radio resources for the PDSCH (the PDSCH for the multicast) including the multicast data for the group communication in the specific subframe, ad performs a predetermined reception process. The UE 100 detects the multicast data through the predetermined reception process.

The SIB13 will be supplementarily described. As illustrated in FIG. 10, the SIB 13 also includes "mbsfn-AreaInfoList." "mbsfn-AreaInfoList" is used when the eNB 200 employs the MBMS scheme as the transmission scheme to the UE 100.

On the other hand, even when the SC-PTM transmission scheme is employed as the transmission scheme for a plurality of UEs 100 (or a certain UE 100) belonging to a certain group, the eNB 200 configures "mbsfn-AreaInfoList" for other UEs which do not belong to a group to which a certain UE 100 and includes it in the SIB 13. When the SC-PTM transmission scheme is applied, a certain UE 100 does not apply the information of "mbsfn-AreaInfoList" indicated in the SIB 13 in order to receive the multicast data for the group communication for its own UE. In this case, a certain UE 100 is able to regard the information of "mbsfn-AreaInfoList" as information applied by other UEs which do not belong to a group to which a certain UE 100 belongs.

"mbsfn-AreaInfoList" illustrated in FIG. 10 includes information necessary for the UE 100 to acquire the MBMS control information associated with one or more MBSFN areas. The information includes "mbsfn-AreaInfo" which is not illustrated in FIG. 10. "mbsfn-AreaInfo" indicates information related to a subframe in which the UE 100 is able to receive a multicast control channel (MCCH). The MCCH is a control channel for giving an indication of a subframe for carrying a multicast traffic channel (MTCH) to the UE 100.

Figure 11:
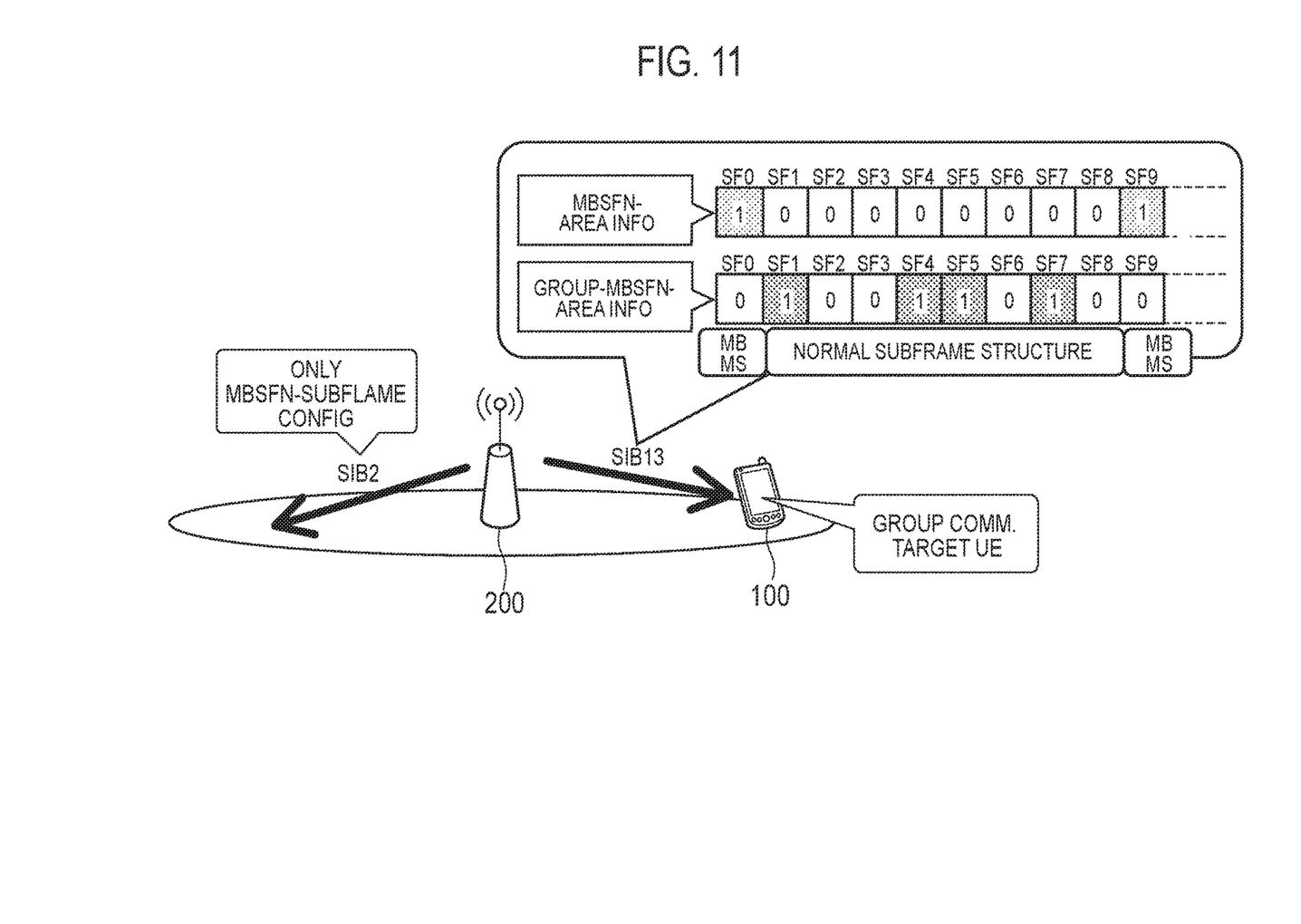
FIG. 11 is a diagram illustrating a communication control method according to the first embodiment.

Next, a communication control method according to the present embodiment will be described with reference to FIG. 11. In FIG. 11, the "SIB 13" corresponds to the "SIB 13" in FIG. 9. Further, in the description of FIG. 11, content of "group Subframe Allocation" and the like illustrated in FIG. 10 will be supplementarily described.

In FIG. 11, the UE 100 is a group communication target as described above. The controller (for example, the processor 240) (not illustrated) of the eNB 200 (hereinafter referred to simply as an "eNB 200" for the sake of convenience of description) configures "Group-MBSFN-AreaInfo" for the group to which the UE 100 belongs, and performs a process of including "Group-MBSFN-AreaInfo" in the SIB 13 together with "MBSFN-AreaInfo" configured for the UE not belonging to the group to which the UE 100 belongs and transmitting it. "Group-MBSFN-AreaInfo" is "group-mbsfn-AreaInfo" described above. "MBSFN-AreaInfo" is "mbsfn-AreaInfo" described above.

"Group-MBSFN-AreaInfo" includes "group Subframe Allocation" described above. "group Subframe Allocation" includes information indicated by a bitmap so that a specific subframe described above is able to be designated together among a predetermined number of subframes included in a predetermined number of radio frames. In the information, specifically, the specific subframe is indicated by "1," and subframes other than the specific subframe are indicated by "0."

In the example of "Group-MBSFN-AreaInfo" illustrated in FIG. 11, a subframe number 1 (SF1), a subframe number 4 (SF4), a subframe number 5 (SF5), and a subframe number 7 (SF7) are indicated by "1," and other subframes are indicated by "0," and thus SF0 to SF9 is able to be constituted by a bitmap "0100110100."

In FIG. 10, as BIT STRING of "group Subframe Allocation," the size is indicated by "40" but it means a bitmap corresponding to 40 subframes. As a format of the bitmap corresponding to 40 subframes, for example, a format in which 40 subframes are collectively indicated by a bitmap or a format in which a reference bitmap corresponding to 10 subframes and 2-bit information indicating that the reference bitmap is repeated four times (for example, "11" when repeated four times) is applied.

Figure 13:
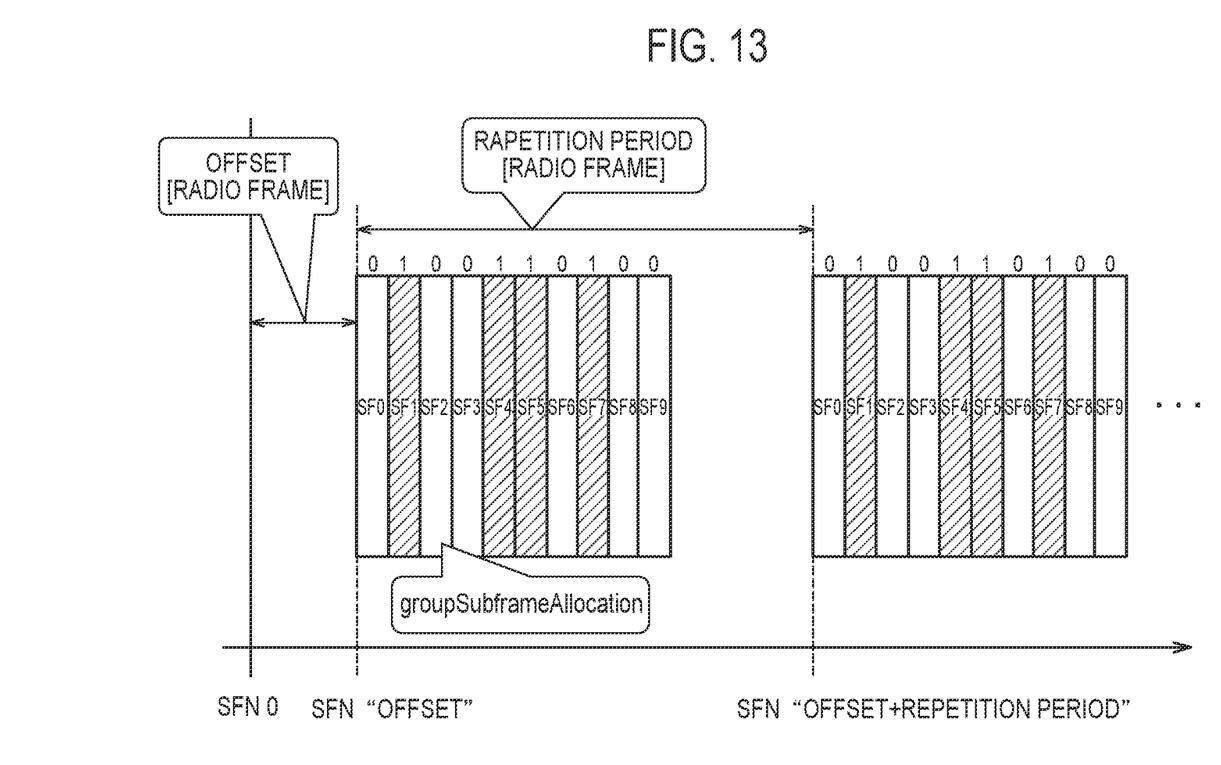
FIG. 13 is a diagram for schematically describing content of a "repetition period" and an "offset" according to the first and second embodiments.

The "Group-MBSFN-AreaInfo" illustrated in FIG. 11 further includes a "repetition period" and an "offset" which are not illustrated in FIG. 10. FIG. 13 is a diagram for schematically describing content of the "repetition period" and the "offset."

As illustrated in FIG. 13, the "repetition period" indicates a period in which a bitmap corresponding to a predetermined number of subframes (10 subframes SF0 to SF9 in FIG. 13) indicated by "group Subframe Allocation" is repeated. This period corresponds to a radio frame unit. For example, when the "repetition period" is a value corresponding to five radio frames, this means that the bitmap indicated by "group Subframe Allocation" is applied once for every five radio frames.

The "offset" is indicated by a value indicating an interval from a system frame number (SFN) used as a reference (SFN0 in FIG. 13) to an SFN to which the bitmap indicated by "group Subframe Allocation" is applied (an SFN "offset" in FIG. 13) in units of radio frames.

In other words, the bitmap indicated by "group Subframe Allocation" is applied at a time position shifted from the SFN used as the reference by an "offset" radio frame. In other words, when it coincides with "SFN mod 'repetition period'=offset," the bitmap indicated by "group Subframe Allocation" is applied. The "repetition period" and the "offset" are defined as "repetition period">"offset."

Figure 14:
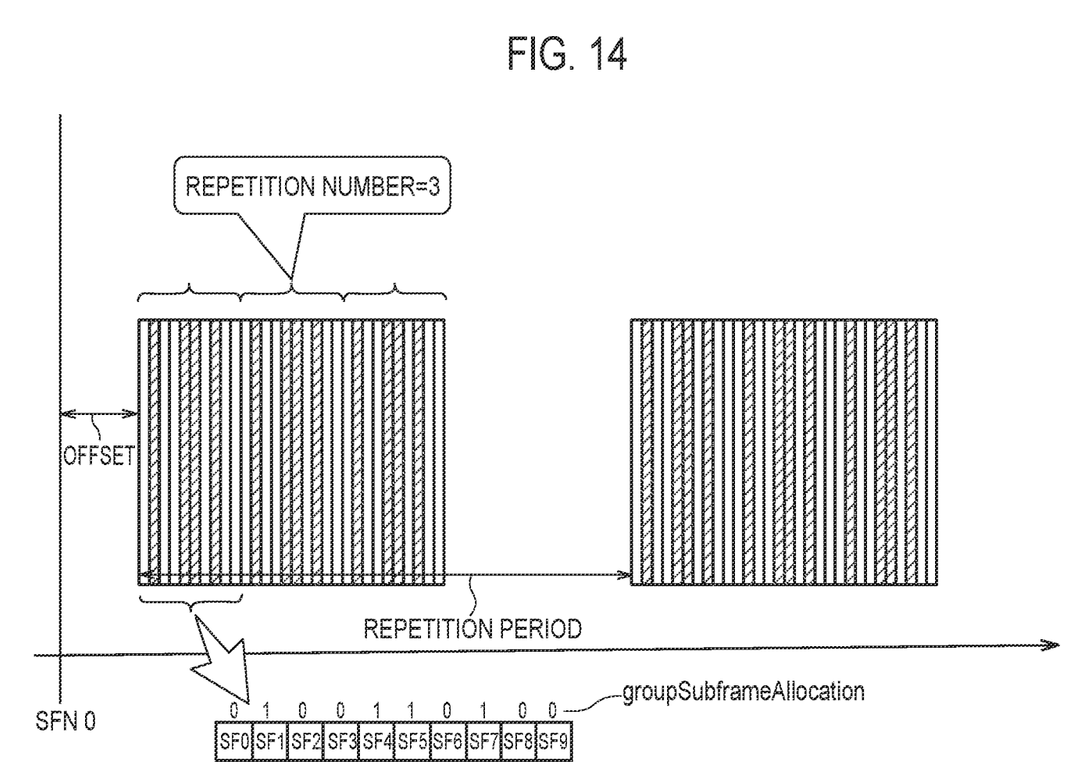
FIG. 14 is a diagram schematically illustrating an example including a "repetition period," an "offset" and a "repetition number" according to the first and second embodiments.

Instead of the example of FIG. 13, "Group-MBSFN-AreaInfo" may be configured to include the "repetition period," the "offset," and the "repetition number" as illustrated in FIG. 14. FIG. 14 schematically illustrates an example including the "repetition period," the "offset," and the "repetition number."

The "repetition period" and the "offset" in FIG. 14 have the same content as the "repetition period" and the "offset" described in FIG. 13. The "repetition number" is information of the number of times (information indicated by bits) indicating that the reference bitmap corresponding to ten subframes (the bitmap indicated by "group Subframe Allocation") is repeated n times (3 times in the example of FIG. 14).

Further, "Group-MBSFN-AreaInfo" is configured not to include the "repetition period" and the "offset" illustrated in FIG. 13 or the "repetition period," the "offset," and the "repetition number" illustrated in FIG. 14.

In FIG. 11, the eNB 200 is also able to execute a process of transmitting MBSFN subframe configuration information (MBSFN-AreaInfo) defining a MBSFN subframe reserved for the MBSFN in the downlink.

In FIG. 11, "MBSFN-AreaInfo" includes information indicated by a bitmap so that the MBSFN subframes is able to be designated together among a predetermined number of subframes included in a predetermined number of radio frames. Specifically, in "MBSFN-AreaInfo," the MBSFN subframe is indicated by "1", and subframes other than the MBSFN subframe are indicated by "0."

In the example of "MBSFN-AreaInfo" illustrated in FIG. 11, since a subframe number 0 (SF0) and a subframe number 9 (SF9) are indicated by "1," and subframes other than the MBSFN subframe are indicated by "0," and thus SF0 to SF9 are constituted by a bitmap "1000000001."

In FIG. 11, the eNB 200 sets subframes other than the MBSFN subframe as the specific subframe when the specific subframe is designated in "Group-MBSFN-AreaInfo" for the UE 100. Alternatively, when the MBSFN subframe is designated in "MBSFN-AreaInfo" for the UE 100, the eNB 200 may set a subframe other than the specific subframe as the MBSFN subframe. Further, the eNB 200 may strictly set the specific subframe and the MBSFN subframe in view of both the setting policies described above.

In FIG. 11, in addition to the transmission of the SIB 13 described above, the eNB 200 is able to transmit (broadcast) a system information block type 2 (SIB 2) even to the user terminal (UE) (the UE not illustrated in FIG. 11) which is not the group communication target which exists in the cell managed by the eNB 200.

In this case, in the SIB 2, the eNB 200 designates only "MBSFN-Subframe Config" indicating the subframe other than the specific subframe as the allocation information of the radio resources related to broadcast/multicast delivery in the SIB 2.

According to the first embodiment, the user terminal serving as the group communication target is able to efficiently receive the multicast data through the PDSCH.

[Second Embodiment]

Next, a communication control method according to a second embodiment will be described focusing on a difference with the first embodiment.

Figure 12:
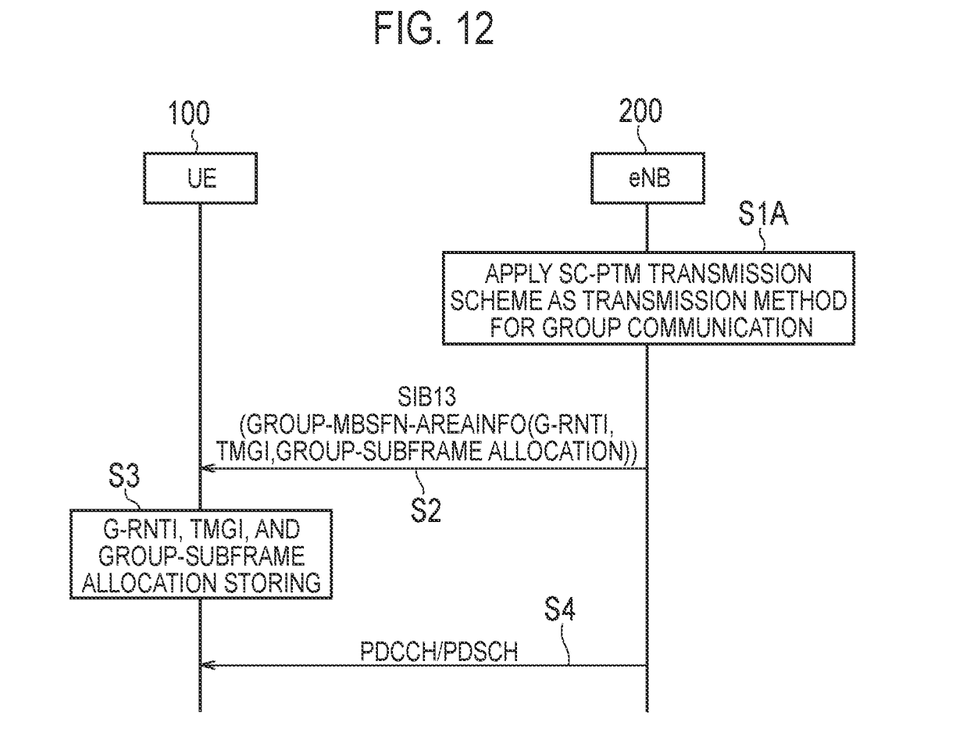
FIG. 12 is a sequence diagram illustrating a communication control method according to the second embodiment.

In the first embodiment, the eNB 200 or the network node (not illustrated) (referred to simply as a "network apparatus" for the sake of convenience of description) decides whether the transmission scheme is the transmission scheme according to the MBMS scheme or the transmission scheme according to the SC-PTM transmission scheme on the basis of the policies described above for the UE 100. On the other hand, in the second embodiment, as illustrated in FIG. 12, when the network apparatus is able to detect that the UE 100 subordinate thereto is the group communication target on the basis of the TMGI stored in its own apparatus, the network apparatus decides to apply the SC-PTM Transmission scheme to the multicast data for the UE 100 (step S1). In other words, the network apparatus applies the SC-PTM transmission scheme as the transmission method for the group communication. The operations other than step S1 are similar to those in the first embodiment.

[Other Embodiments]

In the above embodiments, the example in which "group-mbsfn-AreaInfo" is transmitted through the SIB 13 has been described, but an implementation may be made such that "group-mbsfn-AreaInfo" is transmitted through a newly defined SIB other than the SIB 13.

In the above embodiments, the LTE system has been described as an example of the mobile communication system, but the present disclosure is not limited to the LTE system and may be applied to systems other than the LTE system.

The invention claimed is:

1. A base station, comprising:
a controller configured to perform a process of transmitting an RRC (Radio Resource Control) message including configuration information for a user terminal having an SC-PTM (Single cell point to multipoint) function specified in 3rd Generation Partnership Project (3GPP), wherein
the configuration information includes specific subframe information indicating a specific subframe constituting a physical downlink control channel (PDCCH) and a physical downlink shared channel (PDSCH) for multicast, and
after transmitting the RRC message, the controller is configured to transmit, at the specific subframe, the PDCCH including resource allocation information of the PDSCH.

2. The base station according to claim 1,
wherein the specific subframe information indicates whether each of a predetermined number of subframes is a subframe constituting the PDCCH and the PDSCH for the multicast, and is indicated by a bitmap format.

3. The base station according to claim 2,
wherein the specific subframe information includes information indicating a repetition period of information indicated by the bitmap format.

4. The base station according to claim 2,
wherein the specific subframe information includes offset information applied to information indicated by the bitmap format.

5. The base station according to claim 1,
wherein the configuration information includes a group-radio network temporary identifier (group-RNTI) and a temporary mobile group identity (TMGI), the group-RNTI is an RNTI used when the user terminal decodes the PDCCH including allocation information of the PDSCH for the multicast, and
the TMGI is information indicating a group to which the user terminal belongs.

6. The base station according to claim 1,
wherein MBSFN (MBMS Single Frequency Network) transmission is suppressed in the specific subframe.

7. The base station according to claim 1,
wherein the controller is configured to perform a process of transmitting MBMS single frequency network (MBSFN) subframe configuration information defining a MBSFN subframe reserved for an MBSFN in downlink, and
the controller is configured to set a subframe other than the MBSFN subframe as the specific subframe.

8. The base station according to claim 1,
wherein the controller is configured to perform a process of transmitting MBMS single frequency network (MBSFN) subframe configuration information defining a MBSFN subframe reserved for an MBSFN in downlink, and
the controller is configured to set a subframe other than the specific subframe as the MBSFN subframe.

9. The base station according to claim 1,
wherein the RRC message is a system information block (SIB).

10. The base station according to claim 9,
wherein the RRC message is a system information block (SIB) type 13.

11. A user terminal having an SC-PTM (Single cell point to multipoint) function defined in 3rd Generation Partnership Project (3GPP), comprising:
a controller configured to perform a process of receiving an RRC (Radio Resource Control) message including configuration information from a base station that manages a serving cell, wherein
the configuration information includes specific subframe information indicating a specific subframe constituting a physical downlink control channel (PDCCH) and a physical downlink shared channel (PDSCH) for multicast data to be received by the user terminal, and
after receiving the RRC message, the controller is configured to receive, at the specific subframe, the PDCCH including resource allocation information of the PDSCH.

12. A communication control method, comprising:
transmitting, by a base station, an RRC (Radio Resource Control) message including configuration information for a specific user terminal having an SC-PTM (Single cell point to multipoint) function specified in 3rd Generation Partnership Project (3GPP), wherein
the configuration information includes specific subframe information indicating a specific subframe constituting a physical downlink control channel (PDCCH) and a physical downlink shared channel (PDSCH) for multicast, and
after transmitting the RRC message, the base station transmits, at the specific subframe, the PDCCH including resource allocation information of the PDSCH.

* * * * *